3,149,007
BRAZING COMPOSITIONS
Ernest S. Chamer, Fairfield, Conn., assignor to Handy & Harman, New York, N.Y., a corporation of New York
No Drawing. Filed May 14, 1962, Ser. No. 194,718
8 Claims. (Cl. 148—24)

This invention relates to brazing compositions, and is particularly directed to the provision of an improved brazing composition for joining aluminum and aluminum base alloys. More particularly, the invention provides a new brazing composition that is eminently suited for use in joining aluminum or aluminum alloy parts in commercial salt bath brazing operations.

The new compositions have basically the composition described in U.S. Patent No. 2,893,903, but in addition contain a small amount of sodium or potassium chloride and a hydrophylic thickening agent. By virtue of these additions, the new compositions, unlike that of Patent No. 2,893,903, form with water a firm extrudable paste which, when baked dry in contact with a member to be brazed, becomes hard, strong, and firmly adherent thereto.

The brazing composition described in the above-mentioned patent consist essentially of 1 part by weight of chloride-free $AlF_3$, from 4 to 12 parts by weight of powdered brazing metal alloy (e.g. 88% Al and 12% Si) and sufficient water to form a workable paste or slurry. The use of such paste requires that the slurry be agitated and then applied to the part to be brazed with a dip stick or bulb syringe so as to form a paste fillet contiguous with the surfaces to be joined by brazing. The wet filleted part is then heated to about 1000° F. to drive off all moisture and to harden the fillet into a dry aggregate which adheres more or less well to the workpiece during handling through the next step. The workpiece with the heat-set fillet is then immersed in a molten brazing salt bath at a temperature above the melting point of the Al-Si brazing metal. The latter melts and flows into the joint while the $AlF_3$ is dissolved by and absorbed into the salt bath.

In its wet state, the composition described in the above-mentioned patent has a consistency similar to that of sand in water and requires almost continuous agitation to keep the solids in suspension. This makes the application of the slurry inconvenient and tedious. The slurry cannot be applied by extrusion from a pressure gun of the piston and cylinder type because the water is then squeezed out, leaving an immobile cake of solids in the gun. These compositions also produce rather weak, soft, heat-set fillets which can become detached during handling up to and in the salt bath before the melting temperature is reached.

The major purposes of this invention are to provide brazing compositions in which the solids will stay suspended, which can be extruded from a pressure gun, and which produce heat-set fillets of good hardness and good adherence to the parts to be brazed. All of this is accomplished without producing excessively porous heat-set fillets, and without impairing the brazing ability of the alloy or producing gassy, porous brazing metal fillets on the brazed parts.

These purposes are achieved in the new brazing composition consisting essentially of (a) from 5% to 25% by weight of aluminum fluoride, (b) from ¼% to 3% by weight of an alkali metal chloride of the group consisting of potassium chloride and sodium chloride, (c) from ¼% to 5% by weight of a hydrophylic thickening agent, and (d) the balance an aluminum-base brazing alloy in finely divided form. The new composition, when mixed with water in the proportion of 1 to 4 parts by weight of the dry composition to 1 part by weight of water, forms a firm, extrudable paste which when baked dry in contact with a member to be brazed becomes hard, strong, and firmly adherent thereto.

The thickening agent is preferably of the cellulose type, and most preferably is a methyl cellulose ether. Such thickening agents generally are best used in an amount from ¼% to 1⅓% by weight of the composition. In the preferred composition, the thickening agent will, upon mixing of the composition with a proper amount of water, form a paste having a viscosity in the range from 25,000 to 125,000 poises. The preferred alkali metal chloride is potassium chloride, and it is best present in an amount near 1%, say from ¾% to 1¼%, by weight of the composition. Other features of the new composition, and preferred embodiments of it, are set forth in the following detailed description of the invention.

The basic and major ingredients of the composition are the finely divided brazing alloy and the aluminum fluoride. The aluminum fluoride, $AlF_3$, is a flux salt and is also a component of the salt bath in which brazing is carried out. Their batters generally are made up of alkali metal chlorides, including potassium chloride, and contain a proportion of $AlF_3$.) The $AlF_3$ constitutes from 5% to 25% by weight of the new composition.

Any aluminum-base brazing alloy may be employed in the composition. The alloys most generally used are aluminum-silicon alloys, with or without other additions to lower the melting point or otherwise modify the properties of the alloy. Particular aluminum-silicon brazing alloys that have been found especially satisfactory for use in the new brazing composition have the following nominal compositions (by weight):

(a) 88% aluminum, 12% silicon
(b) 76% aluminum, 10% silicon, 10% zinc, 4% copper
(c) 86% aluminum, 10% silicon, 4% copper The brazing alloy should be finely divided (e.g. minus 200 mesh, U.S. Standard screen series) so as to be readily suspended when the new composition is made into a paste by the addition of water prior to being used. The particular alloy composition and its particular particle size are not, however, of any critical importance to the invention.

The addition of small controlled amounts of certain alkali metal chlorides in accordance with the invention improves the hardness and adherence of the heat-set fillets and more than offsets any weakening effect resulting from porosity due to the thickening agent described in detail hereinbelow. Not all alkali metal chlorides are suitable for this purpose, however, because some rapidly increase the reactivity of the water with the aluminum base brazing alloy in the composition. That, of course, is an appreciable disadvantage because the period of time during which the brazing alloy can resist substantial corrosion in the slurry is almost a direct measure of the useful life of the new composition in the wet state.

Various alkali halides were evaluated in this regard to determine mainly their effect on the hardness of the heated fillet and the reactivity of the water with respect to the brazing alloy. The chlorides of potassium and sodium proved to be the only ones entirely suitable, with the former preferred. The other chlorides and fluorides tested contributed relatively little to the fillet's hardness and caused an objectionable increase in reactivity with the brazing alloy. In these tests, the reactivity of the slurry was measured by the volume of gas liberated from 134 grams of slurry in a period of ten hours, and the hardness of the resulting fillet was measured by the width of a scratch formed by a 40° conical carbide point drawn over the heat-set fillet under a ten gram load. Superiority performance of each alkali metal halide sample was therefore inversely proportional to its resulting liberation of gas and scratch width. Comparison was made on an equimolar basis, after the optimum amount of KCl was established to be 0.9% by weight. The respective brazing compositions in the dry state comprised 89.6% by weight of alloy powder (minus 200 mesh), 9.5% by weight of $AlF_3$ powder, and an amount of the halide equivalent in molar concentration to 0.9% by weight of KCl. To 100 parts by weight of dry powder was added 34 parts by weight of water. The results are tabulated below:

| Alkali Metal Halide | Reactivity (volume of gas liberated in 10 hrs.) ccs. | Hardness (scratch width) |
|---|---|---|
| None | 17 | .100 inch. |
| 0.9 KCl | 19 | .015 inch. |
| 0.7 NaCl | 16 | .45 inch. |
| 0.5 LiCl | 1,000 | .120 inch. |
| 0.7 KF | 65 | .075 inch. |
| 0.5 NaF | 300 | .060 inch. |
| 0.3 LiF | 240 | Penetrated to base. |

It is apparent from these data that the fluorides add little to the hardness of the fillet and increase the reactivity of the wet composition objectionably. Lithium chloride is even more unsatisfactory. Bromides and iodides contribute objectionable foreign ions to the salt bath and promote excessive gassing in the water slurries (i.e. are objectionably reactive with the brazing alloy). KCl has proved the most effective of the alkali hardeners, and NaCl is almost equally suitable. Neither produces a gassy slurry and both render the slurry highly extrudable; their resulting heat-set fillets are quite hard and adhere well to the workpieces prior to and during brazing in the salt bath. KCl is the preferred of the two because the fillet it produces is harder and somewhat more adherent; also it forms a composition which dissolves at a slightly lower temperature in the bath than does NaCl.

In an investigation of the range of KCl content suitable for the new composition, it has been found that about ¼% KCl by weight is the minimum effective amount in dry powder mixtures containing 9 parts alloy to 1 part $AlF_3$. The desired hardness occurs at about 1% (specifically, close to 0.9%) by weight, more being unnecessary; and much more, over about 3% by weight, causes undesirable residues to be left in the brazed fillet. Since the brazing salt bath is a mixture of $AlF_3$ and alkali halides, it is important that the brazing compound contain only those salts and not others which could contaminate the bath.

The composition ranges of the inorganic portions of the composition can best be expressed in these terms:

$AlF_3$—5% to 25% by weight
KCl or NaCl—¼% to 3% by weight, preferably ¾% to 1¼% KCl
Alloy Powder—Balance Not only is the heat set fillet of the new brazing composition harder and more adherent as a result of the alkali metal chloride addition discussed above, but it is also formed from a slurry or paste which is of a viscosity ideal for application by extrusion. This is a notable improvement over the composition described in Patent No. 2,893,903, which cannot be extruded in the slurry condition, and it results from the addition of a hydrophilic thickener. It has been discovered after extensive testing of a wide range of such thickeners that any of them are suitable for purposes of this invention, though some are more advantageous than others. Among the hydrophilic thickening compounds which are satisfactory are vegetable colloid or guar gums such as gum jaguar, gum tragacanth, locust bean gum, gum arabic, gum karaya, agar, alginates, pectins, and starch, or animal colloids such as gelatin, various cellulose ethers and salts such as methyl cellulose ethers and salts (especially the sodium salt) of carboxy methyl cellulose, polyvinyl alcohol, bentonite, lignosulfonate dispersants, colloidal silica, beneficiated magnesium montmorillonite, and polyethylene oxides of high molecular weight (500,000–4,000,000). All are effective to some extent in providing suspending and thickening characteristics to the slurry, though some tend to produce more friable or weaker heat-set fillets, or lessen extrudability, or leave objectionable foreign matter or residues in the brazed fillet. The most desirable thickeners have been found to be those of cellulosic nature, especially the methyl cellulose ethers.

It is impractical to give precise limits to the desirable amounts for all possible thickeners. Finer alloy powders require less thickener to suspend them and produce a slurry of optimum extrudability. A larger amount of water added to a given weight of powder will require more thickener than will a lesser amount of water to produce good suspension of the powder and good extrudability of the slurry. In any event when using the generally preferred organic thickeners, it is desirable to keep the organic content of the compound as low as possible since excess organics tend to produce softer heat-set fillets, and porous brazed fillets with residues. With an optimum inorganic portion comprising 89.6% of 200 mesh alloy powder, 9.5% of $AlF_3$ and 0.9% KCl, the minimum and desirable amount of water is about 1 part by weight of water to 3 parts dry powder mixture, but from about 1 part water to 4 parts powder to about 1 part water to 1 part powder can be made to work depending on the particle sizes in the mixture and conditions of dispersing.

Of all the many hydrophylic thickeners tested, Methocel 65HG400, a dimethyl cellulose ether manufactured by the Dow Chemical Company, is preferred. This has a methoxyl content of 27% to 29% with a degree of substitution of 1.61% to 1.75%, and a propylene glycol ether content of 4% to 7.5% with a degree of substitution of 0.1% to 0.18% by weight. In the dry state of the brazing composition, this dimethyl cellulose ether thickener should constitute from ⅔% to 1⅓% by weight of the whole, with the optimum amount close to ⅔% by weight. When this dry composition is mixed with water in a weight ratio of three parts powder to one of water, it produces a slurry viscosity of from 25,000 to 125,000 poises at 50 r.p.m. in a Brookfield Viscosimeter with a No. 7 spindle. It is preferred to maintain a low viscosity consonant with the requirements of a good fillet because extrusion pressure is then kept to a minimum and less thickener is required (which results in reduced porosity in the heatted fillet).

Dimethyl cellulose ether is also preferred as a thickener because it exhibits both thixotropy and heat gelation in the brazing composition. Thixotropy is a desirable characteristic in the thickener since it renders the slurry mobile while it is being extruded. This permits the extruded fillet to thicken while it is no longer being disturbed by extrusion, thereby preventing the wet fillet from creeping. Heat gelation, which is the tendency to form a gel when heating (this is an unusual characteristic as gels usually tend to break under heat), is desirable as this tends to keep the fillet immobile during the baking process.

Among the aforementioned other thickeners which may be used, the one next preferred is hydroxy ethyl cellulose, sold commercially under the trade name "Natrosol," which is a satisfactory thickener when present even in concentrations as low as ¼% by weight of the composition. It is, however, somewhat less desirable than Methocel as it is "ashy" and makes braze fillets not as free of residues as does Methocel.

I find it desirable to mix all of the solids of the composition, i.e. alloy powder, the $AlF_3$ powder, the KCl powder, and the thickener, in dry form and to store the mixture in the dry state until it is ready for use. It is then only necessary to add one part of cold water to the desired amount (generally 1 to 4 parts and preferably about 3 parts) of powder mixture and stir. The slurry is then ready to use in a pressure gun and will give optimum usefulness in the wet state for about 8 hours.

In one example of the new brazing composition, a brazing alloy of nominally 88% aluminum and 12% silicon was prepared in powdered form of minus 200 mesh particle size. Powered $AlF_3$ and $KCl$ were then mixed with the alloy powder in a ratio by weight of 89.6% alloy, 9.5% $AlF_3$, and 0.9% $KCl$. Then 327.8 grams of this inorganic mixture were mixed with 2.2 grams of minus 200 mesh powdered Methocel 65HG400 by turning the whole for fifteen minutes with baffles. This produced a brazing composition in the powdered dry state of 99.33% inorganic material and .67% Methocel, by weight.

Next, 180 grams of the brazing composition were mixed with 60 cc. of cold tap water and left standing. The resulting slurry had a viscosity of 26,000 poises at 50 r.p.m. on a Brookfield Viscosimeter with a No. 7 spindle at room temperature of 77° F. Each 134 grams of this slurry evolved only about 20 cc. of gas in a ten hour period, which indicates an acceptably low level of reactivity in the wet state.

The slurry was then transferred to a pneumatic gun, and extruded through a 1/16 inch diameter nozzle along a cleaned joint where an aluminum tube projected through a corresponding hole in an aluminum sheet. The fillet of wet brazing composition thus extruded was satisfactory in all respects. The parts with the fillet adhered thereto were then baked at 1000° F. for six minutes to heat-set the brazing composition. The heat-set fillet was sufficiently hard and adherent to be handled, and to remain in position for an extended period of time. Then the parts were immersed for one minute in a conventional salt brazing bath at 1100° F. The resulting braze at the joint between the aluminum tube and sheet was of excellent quality. There was no loss of the brazing composition fillet in the salt bath prior to formation of the brazed joint, and no deposition of an objectionable residue or formation of porosity in the brazing alloy fillet of the finished work.

I claim:

1. A brazing composition suitable for joining aluminum and aluminum-base alloys consisting essentially of
   (a) from 5% to 25% by weight aluminum flouride,
   (b) from 1/4% to 3% by weight of an alkali metal chloride selected from the group consisting of potassium chloride and sodium chloride,
   (c) from 1/4% to 5% by weight of a hydrophilic thickening agent, and
   (d) the balance an aluminum-base brazing alloy in finely divided solid form,
said composition when mixed with water in the proportions of 1 to 4 parts by weight of composition to 1 part by weight of water forming a firm, extrudable paste which when baked dry in contact with a member to be brazed becomes hard, strong and firmly adherent thereto.

2. A brazing composition suitable for joining aluminum and aluminum-base alloys consisting essentially of
   (a) from 5% to 25% by weight aluminum fluoride,
   (b) from 1/4% to 3% by weight of an alkali metal chloride selected from the group consisting of potassium chloride and sodium chloride,
   (c) from 1/2% to 1 1/3% by weight of a hydrophilic cellulosic thickening agent, and
   (d) the balance an aluminum-base brazing alloy in finely divided powdered form,
said composition when mixed with water in the proportions of 1 to 4 parts by weight of composition to 1 part by weight of water forming a firm, extrudable paste having a viscosity in the range from 25,000 to 125,000 poises which when baked at 800° to 1050° F. in contact with a member to be brazed becomes hard, strong, and firmly adherent thereto.

3. A brazing composition according to claim 2 in which the alkali metal chloride is potassium chloride and in which the thickening agent is a methyl cellulose ether.

4. A brazing composition according to claim 3 containing about 10% by weight aluminum fluoride, about 1% by weight potassium chloride and about 2/3% methyl cellulose ether.

5. A brazing composition according to claim 2 in which the finely divided brazing alloy is an aluminum-silicon alloy.

6. A brazing composition according to claim 5 in which the aluminum-silicon alloy is selected from the group consisting of (a) about 88% aluminum, 12% silicon, (b) about 76% aluminum, 10% silicon, 10% zinc, 4% copper, and (c) about 86% aluminum, 10% silicon, 4% copper.

7. A brazing composition according to claim 1 in which the thickening agent is a guar gum.

8. A brazing composition according to claim 1 in which the thickening agent is a vegetable colloid.

References Cited in the file of this patent

UNITED STATES PATENTS

| 2,316,745 | Robertson et al. | Apr. 13, 1943 |
| 2,445,374 | Wyck | July 20, 1948 |
| 2,566,887 | Hook | Sept. 4, 1951 |
| 2,848,321 | Bunbury | Aug. 19, 1958 |

FOREIGN PATENTS

| 871,813 | Great Britain | July 5, 1961 |